(12) United States Patent
Lee et al.

(10) Patent No.: US 9,779,311 B2
(45) Date of Patent: Oct. 3, 2017

(54) INTEGRATED CONTROL SYSTEM AND METHOD USING SURVEILLANCE CAMERA FOR VEHICLE

(71) Applicant: HANWHA TECHWIN CO.,LTD., Changwon-Si (KR)

(72) Inventors: Hyun-Jin Lee, Changwon (KR); Jeong-Eun Lim, Changwon (KR); Sun-Ki Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 194 days.

(21) Appl. No.: 14/364,881

(22) PCT Filed: Nov. 21, 2012

(86) PCT No.: PCT/KR2012/009860
§ 371 (c)(1),
(2) Date: Jun. 12, 2014

(87) PCT Pub. No.: WO2013/115470
PCT Pub. Date: Aug. 8, 2013

(65) Prior Publication Data
US 2014/0375813 A1    Dec. 25, 2014

(30) Foreign Application Priority Data

Jan. 31, 2012   (KR) ................ 10-2012-0009741

(51) Int. Cl.
*G06K 9/00* (2006.01)
*G08G 1/017* (2006.01)
(Continued)

(52) U.S. Cl.
CPC .......... *G06K 9/00791* (2013.01); *B60R 11/04* (2013.01); *G06K 9/325* (2013.01); *G08G 1/017* (2013.01)

(58) Field of Classification Search
None
See application file for complete search history.

(56) References Cited

U.S. PATENT DOCUMENTS 6,081,206 A * 6/2000 Kielland ............ G06Q 30/0284
                                                  194/902
6,747,687 B1 * 6/2004 Alves .................... H04N 7/188
                                                  340/932.2
(Continued)

FOREIGN PATENT DOCUMENTS

JP     2003288672 A    10/2003
JP     2009-20774 A    1/2009
(Continued)

OTHER PUBLICATIONS

Communication dated Jan. 23, 2017, issued by the Korean Intellectual Property Office in counterpart Korean Application No. 10-2012-0009741.

*Primary Examiner* — Kate Luo
(74) *Attorney, Agent, or Firm* — Sughrue Mion, PLLC (57) ABSTRACT

An integrated control system and method using a vehicle surveillance camera, the method including: receiving vehicle license plate number information obtained by analyzing an image captured using the vehicle surveillance camera, from the vehicle surveillance camera via a server; receiving time information and position information about when and where the captured image was generated, from the vehicle surveillance camera via the server; and constructing a database by referring to the vehicle license plate number information, the time information, and the position information received via the server.

8 Claims, 8 Drawing Sheets

[TIME 1] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]
[TIME 2] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]
[TIME 3] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]
⋮
[TIME 4] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]

(51) Int. Cl.
*B60R 11/04* (2006.01)
*G06K 9/32* (2006.01)

(56) References Cited

U.S. PATENT DOCUMENTS

| | | | | |
|---|---|---|---|---|
| 2003/0122930 | A1* | 7/2003 | Schofield | B60R 1/00 348/148 |
| 2003/0125981 | A1* | 7/2003 | Pedrazzoli Pazos | G06Q 30/04 705/34 |
| 2004/0201460 | A1* | 10/2004 | Bucholz | B60R 25/305 340/426.1 |
| 2004/0233036 | A1* | 11/2004 | Sefton | G07B 15/04 340/5.53 |
| 2006/0017562 | A1* | 1/2006 | Bachelder | G08G 1/017 340/531 |
| 2007/0069921 | A1* | 3/2007 | Sefton | G08G 1/0175 340/932.2 |
| 2007/0208681 | A1* | 9/2007 | Bucholz | G08G 1/017 706/47 |
| 2010/0079590 | A1* | 4/2010 | Kuehnle | G06K 9/00798 348/118 |
| 2010/0299021 | A1* | 11/2010 | Jalili | G07C 5/085 701/33.4 |

FOREIGN PATENT DOCUMENTS

| | | |
|---|---|---|
| JP | 2009-83815 A | 4/2009 |
| KR | 1019980010935 A | 4/1998 |
| KR | 10-2009-0046477 A | 5/2009 |
| KR | 1020100108824 A | 10/2010 |
| KR | 10-2011-0077454 A | 7/2011 |
| KR | 1020110088012 A | 8/2011 |

* cited by examiner

[TIME 1] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]
[TIME 2] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]
[TIME 3] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]
. . .
[TIME 4] [LATITUDE][LONGITUDE] [LEFT FRONT (VEHICLE NUMBER)] [FRONT FACE (VEHICLE NUMBER)] [RIGHT FRONT (VEHICLE NUMBER)] [CURRENT SPEED]

INTEGRATED CONTROL SYSTEM AND METHOD USING SURVEILLANCE CAMERA FOR VEHICLE

CROSS-REFERENCE TO RELATED PATENT APPLICATION

This application claims the benefit of Korean Patent Application No. 10-2012-0009741, filed on Jan. 31, 2012, in the Korean Intellectual Property Office, the disclosure of which is incorporated herein in its entirety by reference.

BACKGROUND OF THE INVENTION

1. Field of the Invention

The present invention relates to an integrated control system and method using a vehicle surveillance camera, and more particularly, to an integrated control system and method using a vehicle surveillance camera, in which vehicle information about nearby vehicles is obtained using a camera installed inside a vehicle, and the vehicle information is transmitted to an integrated control server to generate a database, thereby enabling efficient detection and search of road conditions.

2. Description of the Related Art

Recently, to investigate accident history and to record driving states, a black box, that is, a surveillance camera, is installed not only in air planes but also in automobiles. A black box is referred to as an event data recorder (EDR), and is mostly in the form of cameras. A black box is installed in a vehicle near a rear-view mirror or on a dashboard, and captures images in front of a vehicle and records the same as video images to be used in judging a traffic accident fairly.

Some vehicle surveillance cameras include at least two cameras, and capture images not only of a front side but also images of a backside and lateral sides. In addition, in vehicles like taxis and buses used by an unspecified number of the general public, a black box that captures even inside of a vehicle while recording voice is installed.

Korean Patent Publication No. 2009-0046477 discloses a black box including a built-in camera lens unit for performing a recording function and a microphone for recording an external voice, and a user terminal that automatically transmits recorded data to a receiving device.

Meanwhile, current integrated road control systems not only count the number of vehicles on a road but are also used to control overall road conditions by conducting controls such as control of accident spots and control of congested blocks.

SUMMARY OF THE INVENTION

The present invention provides a system capable of efficiently detecting road conditions and searching data regarding the road conditions by recognizing vehicle license number plates of nearby vehicles using a vehicle surveillance camera and by metadatabasing the road conditions using the recognized vehicle license number plates and position and time information of a current vehicle.

The present invention also provides a method of using an integrated road control system, in which road information obtained using a vehicle surveillance camera is transmitted to an integrated control server not as image information but as text information to thereby reduce communication traffic.

According to an aspect of the present invention, there is provided an integrated control method using a vehicle surveillance camera, the method comprising: receiving vehicle license plate number information obtained by analyzing an image captured using the vehicle surveillance camera, from the vehicle surveillance camera via a server; receiving time information and position information about when and where the captured image was generated, from the vehicle surveillance camera via the server; and constructing a database by referring to the vehicle license plate number information, the time information, and the position information received via the server.

The vehicle license plate number information, the time information, and the position information may be converted into metadata.

The vehicle license plate number information, the time information, and the position information may be data that are obtained by analyzing a captured image for each of frames and structuring the analyzed data.

The vehicle surveillance camera may be installed on at least one of a front side, a lateral side, and a backside of a vehicle.

The vehicle license plate number information, the time information, and the position information received via the server may be coded data.

The method may further comprise: receiving a request to search for a vehicle at a predetermined position and a predetermined time, via the server; extracting data that corresponds to the search request, from the database, via the server; and extracting a vehicle number from the extracted data, via the server.

The method may further comprise: receiving a request to search for a predetermined vehicle from a user terminal; extracting any data including the vehicle license plate number information of the predetermined vehicle from the database, via the server; listing the time information corresponding to the extracted data according to time; obtaining a movement path of the predetermined vehicle by using the position information corresponding to the listed data.

The method may further comprise, when the server is to search for a time period required to pass a section between a first position and a second position, wherein the first position is a start position and the second position is an arrival position: extracting the vehicle license plate number information including both information regarding the first position and information regarding the second position from the database, via the server; calculating time required for a vehicle having the extracted vehicle license plate number information to pass the section by using time information corresponding to the information regarding the first position and the information regarding the second position, via the server; and calculating an average of the time required for the vehicle having the extracted vehicle license plate number information to pass the section.

According to another aspect of the present invention, there is provided an integrated control system comprising: a communication unit for receiving vehicle license plate number information obtained by analyzing an image captured by using a vehicle surveillance camera and time information and position information regarding when and where the captured image was generated; a database constructing unit for constructing a database by referring to the received vehicle license plate number information, the time information, and the position information of a vehicle; and a searching unit for receiving a request to search for at least one of a vehicle number, a time required to pass a section, a movement path, from a user terminal, and searching the database and providing data that corresponds to the request.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The embodiments will be described in detail such that one of ordinary skill in the art may easily work the present invention. It should be understood that the embodiments of the present invention may vary but do not have to be mutually exclusive. For example, particular shapes, structures, and properties according to a predetermined embodiment described in this specification may be modified in other embodiments without departing from the spirit and scope of the prevent invention. In addition, positions or arrangement of individual components of each of the embodiments may also be modified without departing from the spirit and scope of the present invention. Accordingly, the detailed description below should not be construed as having limited meanings but construed to encompass the scope of the claims and any equivalent ranges thereto. In the drawings, like reference numerals denote like elements in various aspects.

Hereinafter, the present invention will now be described more fully with reference to the accompanying drawings, in which exemplary embodiments of the present invention are shown such that one of ordinary skill in the art may easily work the invention.

Expressions such as "at least one of," when preceding a list of elements, modify the entire list of elements and do not modify the individual elements of the list.

Figure 1:
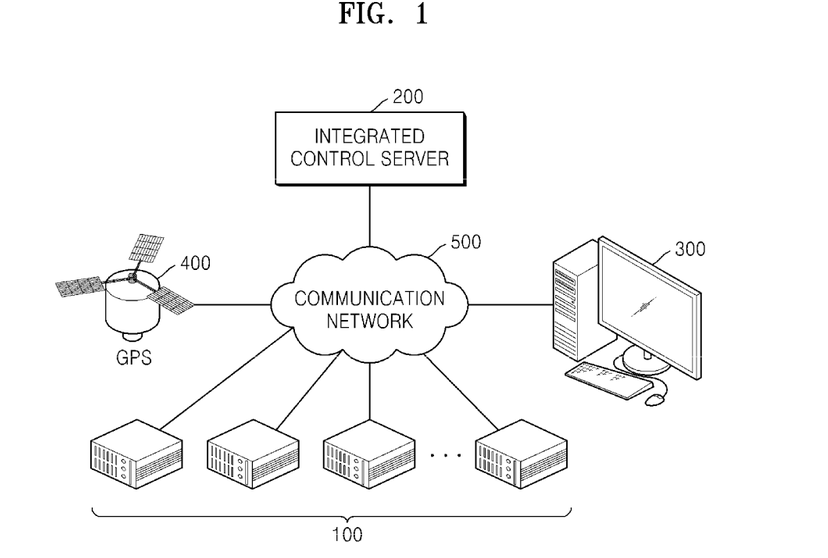
FIG. 1 is a schematic view of an integrated control system according to an embodiment of the present invention.

FIG. 1 is a schematic view of an integrated control system according to an embodiment of the present invention.

Referring to FIG. 1, the integrated control system includes a plurality of vehicle surveillance cameras 100 included in a vehicle, an integrated control server 200, a user terminal 300, a global positioning system (GPS) 400, and a communication network 500.

First, the plurality of vehicle surveillance cameras 100 included in a vehicle may be in the form of a well-known black box capable of capturing images of external conditions of the vehicle as a video or still image and also capable of recognizing vehicle license number plates of other vehicles. The function of recognizing vehicle license number plates may be performed using an optical character recognition (OCR) technique where letters or numbers are extracted from a captured image.

Also, the vehicle surveillance cameras 100 may communicate with the GPS 400 to obtain a position of a current vehicle in which the vehicle surveillance cameras 100 are installed. The vehicle surveillance cameras 100 are usually installed inside a vehicle and used in investigating an accident history, but in times other than when an accident has occurred, the vehicle surveillance cameras 100 may monitor nearby situations and transmit information of nearby vehicles to the integrated control server 200.

Next, the integrated control server 200 may receive a position and time when an image is captured and license number plate number information of a vehicle existing on the captured image from the vehicle surveillance cameras 100 to construct a database 240.

In detail, the integrated control server 200 receives vehicle license plate number information of nearby vehicles from the vehicle surveillance cameras 100 and constructs the database 240 by referring to position information and time information, and provides a search function. The integrated control server 200 may convert the information received from the vehicle surveillance cameras 100 into metadata and store the same in the database 240. That is, the integrated control server 200 may structuralize position information and time information of a predetermined vehicle whose vehicle number is captured so as to construct the database 240. The integrated control server 200 will be described in more detail later.

Next, the user terminal 300 may provide a corresponding interface when a user searches for data of the integrated control server 200 or when the user modifies a configuration of the integrated control server 200.

The user may use the user terminal 300 to search the integrated control system to search for a path of a predetermined vehicle, a probable vehicle involved in an accident, or a time required to pass a section.

Also, the user may register the vehicle surveillance cameras 100, which provide information to the integrated control server 200, to the user terminal 300. Alternatively, the user terminal 300 may automatically search for the vehicle surveillance cameras 100 capable of communicating with the GPS 400 and include a function of recognizing vehicle license number plates to register the same.

Next, according to the current embodiment of the present invention, the GPS 400 may communicate with the vehicle surveillance cameras 100 to provide current position information to the vehicle surveillance cameras 100 or may directly provide the position information to the integrated control server 200.

Next, the communication network 500 allows the integrated control server 200, the vehicle surveillance cameras 100, and the user terminal 300 to communicate with one another. That is, the communication network 500 allows the vehicle surveillance cameras 100 to transmit a vehicle number and position information and time information of a vehicle to the integrated control server 200, and provides a connection path for the user terminal 300 to use data of the integrated control server 200.

Figure 2:
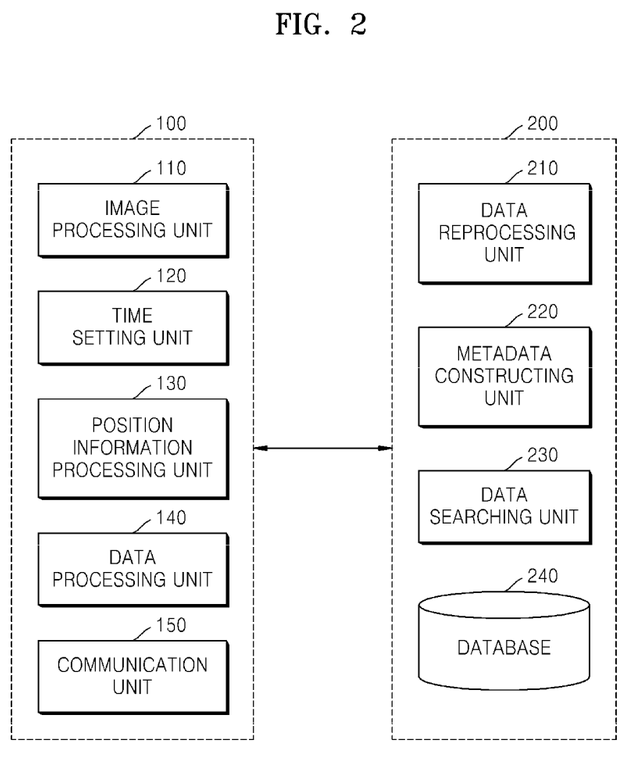
FIG. 2 illustrates a detailed structure of an integrated control system according to an embodiment of the present invention.

FIG. 2 illustrates a detailed structure of an integrated control system according to an embodiment of the present invention.

Referring to FIG. 2, the vehicle surveillance camera 100 includes a communication unit 150, an image processing unit 110, a time setting unit 120, a position information processing unit 130, and a data processing unit 140, and the integrated control server 200 includes a data reprocessing unit 210, a metadata constructing unit 220, a data searching unit 230, and the database 240.

First, the image processing unit 110 of the vehicle surveillance camera 100 obtains vehicle information of nearby vehicles by using a captured image. That is, an area recognized as a license number plate is designated on the captured image, and then the number of the vehicle on the captured image is recognized using a character recognition technique. Additionally, the image processing unit 110 may obtain a color and type of the vehicle by using the captured image.

Examples of conventional vehicle surveillance cameras are those that capture only an incident of collision by sensing an exceptionally abrupt motion of a vehicle, or those that operate only during parking, and generally those that capture all the time during driving regardless of whether collision has occurred or not. Accordingly, most of captured image data except for data obtained before and after the time of an accident is meaningless data. However, according to the vehicle surveillance camera 100 of the current embodiment of the present invention, information about nearby vehicles may also be obtained during normal driving by using captured images, thereby efficiently using the vehicle surveillance camera 100.

In addition, while a conventional integrated road control system captures road conditions using a closed circuit television (CCTV) and transmits the same to a server, this method requires a large amount of data transmission, and in reality, CCTVs cannot be installed on every road. Thus, not all road conditions can be monitored. However, according to the current embodiment of the present invention, the image processing unit 110 analyzes captured images and transmits vehicle license plate number information as texts, thereby reducing a data transmission amount and without having to be burdened with installation of CCTVs directly on roads.

According to the integrated control system of the current embodiment of the present invention, information on road conditions may be efficiently obtained by using the vehicle surveillance camera 100. In particular, even when the vehicle surveillance camera 100 is not installed in some vehicles, an area of an image that may be captured by the vehicle surveillance camera 100 is not limited to a front side, and thus road information within various ranges may be obtained even when the vehicle surveillance camera 100 is not installed in every vehicle.

Figure 3:
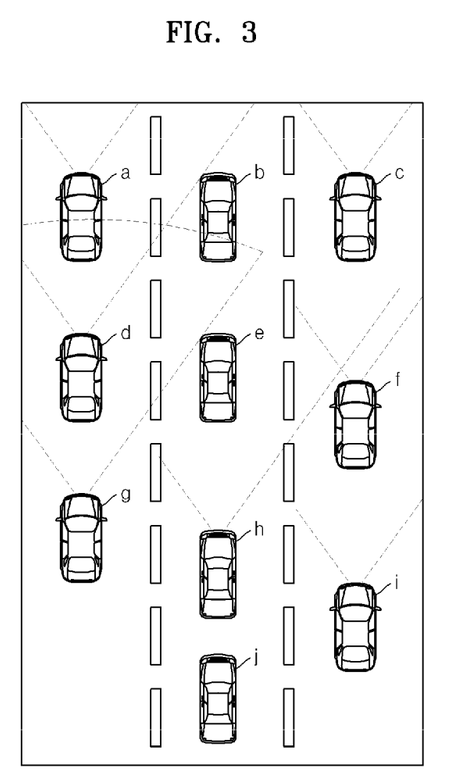
FIG. 3 is a schematic view illustrating a range in which a vehicle surveillance camera may capture an image, according to an embodiment of the present invention.

FIG. 3 is a schematic view illustrating a range in which the vehicle surveillance camera 100 may capture an image, according to an embodiment of the present invention.

Referring to FIG. 3, vehicles a, c, d, f, g, h, and i in which the vehicle surveillance camera 100 is installed and vehicles b, e, and j in which the vehicle surveillance camera 100 is not installed may be assumed to be on the same road. In this case, the vehicle e is not able to transmit an image of a license number plate of the vehicle b, but as a range of photographing of the vehicle g behind the vehicle e includes the vehicle b, may transmit road conditions to the integrated control server 200 by referring to vehicle information about a plurality of vehicles that are captured in one screen even when a corresponding vehicle is not directly on a front side, by using a wide viewing angle of the vehicle surveillance camera 100.

Next, the time setting unit 120 records times when the vehicle surveillance camera 100 has captured images. The time setting unit 120 may communicate with the integrated control server 200 or the GPS 400 to download time information. Alternatively, the time setting unit 120 may use a real time clock function to reduce time error by performing a time function even when an engine of a vehicle has stopped.

Next, the position information processing unit 130 may store a current position of a vehicle in which the vehicle surveillance camera 100 is installed, as determined by the GPS 400, and convert the same into data. The position information processing unit 130 may obtain positions of the vehicle from the GPS 400 when capturing images.

The data processing unit 140 may construct data that is obtained by using the image processing unit 110, the time setting unit 120, and the position information processing unit 130, in a metadata format and code the same. The data obtained by using the image processing unit 110, the time setting unit 120, and the position information processing unit 130 may be generated as data structuralized with respect to a predetermined vehicle, and structured data of each row may be generated as one piece of data for each of captured images.

Figure 4:
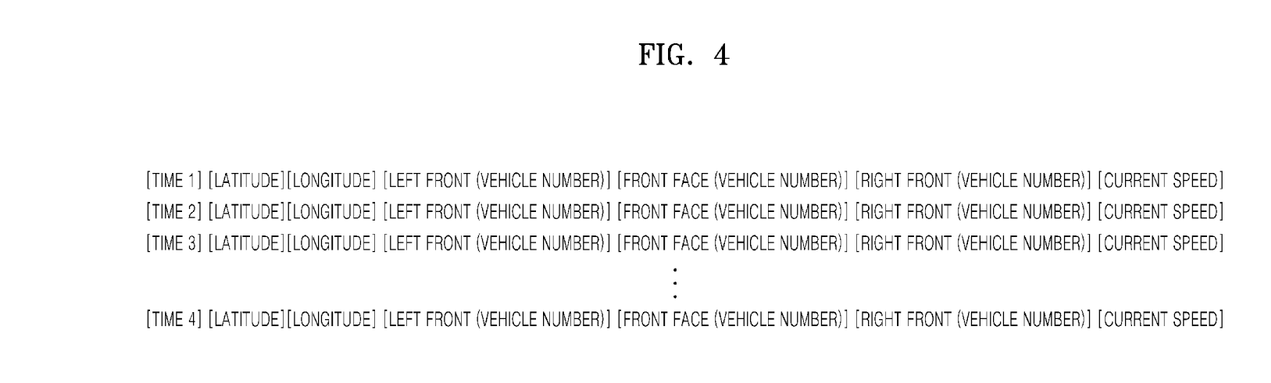
FIG. 4 illustrates data converted from an image obtained using a vehicle surveillance camera, according to an embodiment of the present invention.

FIG. 4 illustrates data converted from an image obtained using the vehicle surveillance camera 100, according to an embodiment of the present invention.

Referring to FIG. 4, vehicle operation information may include time, position (latitude, longitude), license number (left front, front face, right front), and a current speed of a vehicle. Referring to FIG. 4, the license number information may include number information of the left front, the front face, and the right front, but is not limited thereto, and may include any license number information that is recognizable by the image processing unit 110. Also, while FIG. 4 indicates a current speed of a vehicle, the speed may be obtained from the GPS 400 or from a speed indicator installed in the vehicle.

Data of a row illustrated in FIG. 4 is a result obtained by analyzing an image or a frame of a video image captured using the vehicle surveillance camera 100, by using the image processing unit 110. That is, time information and position information regarding when and where an image was generated may be recorded, and vehicle numbers recognized by using the image processing unit 110 may be recorded to generate a piece of unit data. A set of such pieces of unit data may be processed to metadata.

The data processing unit 140 may continuously write data as illustrated in FIG. 4 and code and transmit the same to the integrated control server 200. A coding method may be a method of mixing sequences of bits of data using a predetermined algorithm or a method of grouping data units into blocks, and other well-known data coding methods may be used.

Next, the data reprocessing unit 210 of the integrated control server 200 decodes the data transmitted from the vehicle surveillance camera 100 and integrates the decoded data with other previously existing data. The decoding method may vary according to the vehicle surveillance camera 100, and the data reprocessing unit 210 may decode data by referring to information of a device that has transmitted the data.

Next, the metadata constructing unit 220 stores data in the database 240 in a metadata format. In detail, the metadata constructing unit 220 may store data as illustrated in FIG. 4 arranged in the order of license numbers as a structured data format with respect to vehicle numbers, or may construct the database 240 in a data format structured while describing time information or position information of the vehicle.

Figure 5:
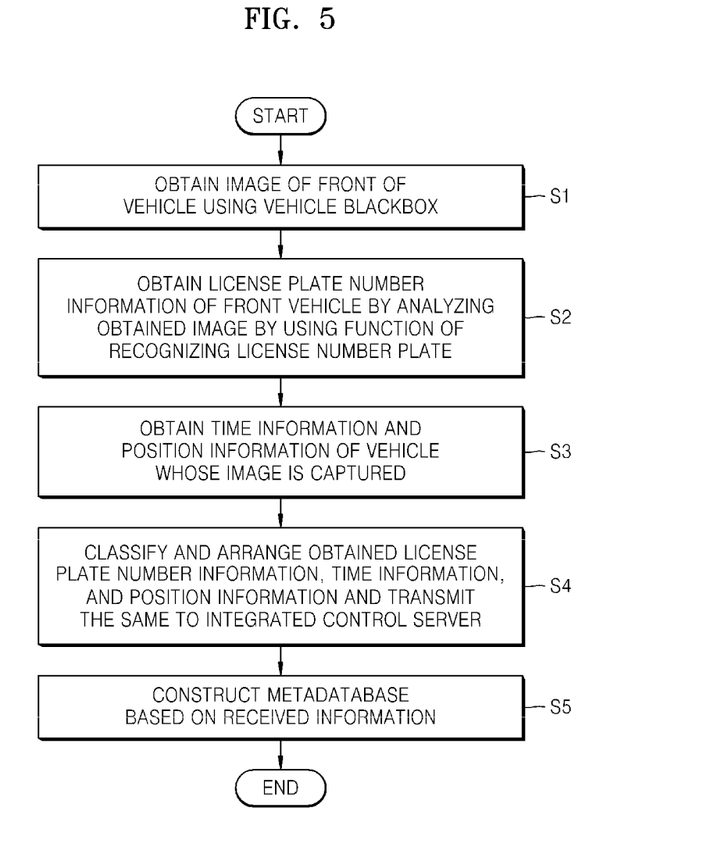
FIG. 5 is a flowchart illustrating a method of constructing a database based on information transmitted by a vehicle surveillance camera, according to an embodiment of the present invention.

FIG. 5 is a flowchart illustrating a method of constructing the database 240 based on information transmitted by the vehicle surveillance camera 100, according to an embodiment of the present invention.

Referring to FIG. 5, first, an image of a front side of a vehicle is obtained using the vehicle surveillance camera 100 in operation S1. As described above, images of a front side, a backside, or a lateral side may be obtained according to a position where the vehicle surveillance camera 100 is installed.

Next, in operation S2, the obtained image is analyzed using a license number plate recognizing function to obtain license plate number information of a vehicle located at the front side.

Next, in operation S3, the time setting unit 120 and the position information processing unit 130 obtain and store time information and position information of a vehicle whose image is captured.

Next, in operation S4, the obtained license number plate number information, time information, and position information are classified and arranged and transmitted to the integrated control server 200.

Next, in operation S5, the integrated control server 200 constructs the database 240 based on the received information.

Next, if there is a request from the user terminal 300, the data searching unit 230 may search the database 240 to provide data. When the request of the user terminal 300 is to search for a predetermined vehicle, the data searching unit 230 may provide all data including the number of the predetermined vehicle to thereby provide meaningful information. Also, if the request of the user terminal 300 is to search for a vehicle that has passed through at a predetermined time and a predetermined position, the data searching unit 230 may provide corresponding information. The data searching unit 230 providing traffic condition information according to a user request will be described with reference to FIGS. 6, 7 and 8 below.

Figure 6:
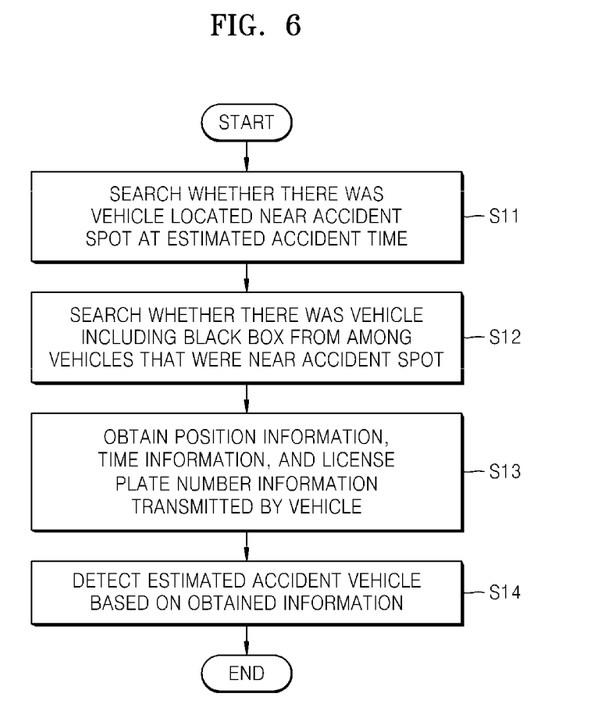
FIG. 6 is a flowchart illustrating a method of searching for a probable vehicle involved in an accident, according to an embodiment of the present invention.

FIG. 6 is a flowchart illustrating a method of searching for a probable vehicle involved in an accident, according to an embodiment of the present invention.

Referring to FIG. 6, first, a user requests to search for whether there was a vehicle near a spot of an accident at an estimated time of the accident by using the user terminal 300.

In operation S12, information of a vehicle in which a black box is installed from among vehicles that were located near the accident spot is searched for.

Next, in operation S13, position information, time information, and license number plate number information transmitted from the vehicle surveillance camera 100 installed in the corresponding vehicle are obtained.

Finally, in operation S14, a probable vehicle involved in the accident is detected based on the obtained information. By using the above-described method, the integrated control server 200 may detect a vehicle that has caused an accident in a hit-and-run case.

Figure 7:
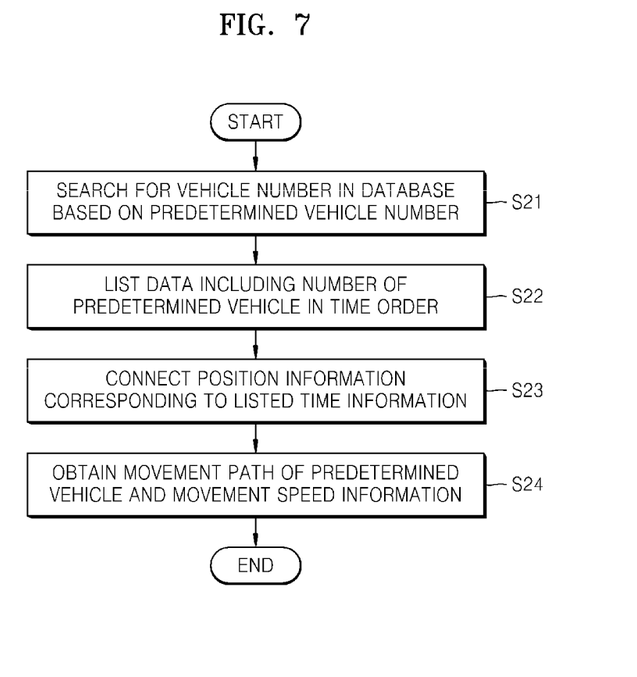
FIG. 7 is a flowchart illustrating a method of searching for a movement path of a vehicle, according to an embodiment of the present invention.

FIG. 7 is a flowchart illustrating a method of searching for a movement path of a vehicle, according to an embodiment of the present invention.

Referring to FIG. 7, a user searches for data related to a license number plate in the database 240 by using the user terminal 300.

Next, in operation S22, the integrated control server 200 gives data including the number of a predetermined vehicle, ordered according to time, after receiving a request.

Next, in operation S23, using position information corresponding to the listed time information to connect position on map, which position is passed by the vehicle.

Finally, in operation S24, a position connected on the map and time information corresponding to the position information are referred to in order to calculate a movement path and movement speed of the predetermined vehicle.

According to the current embodiment of the present invention, a user may search for which a movement path and at what speed a predetermined vehicle has moved.

Figure 8:
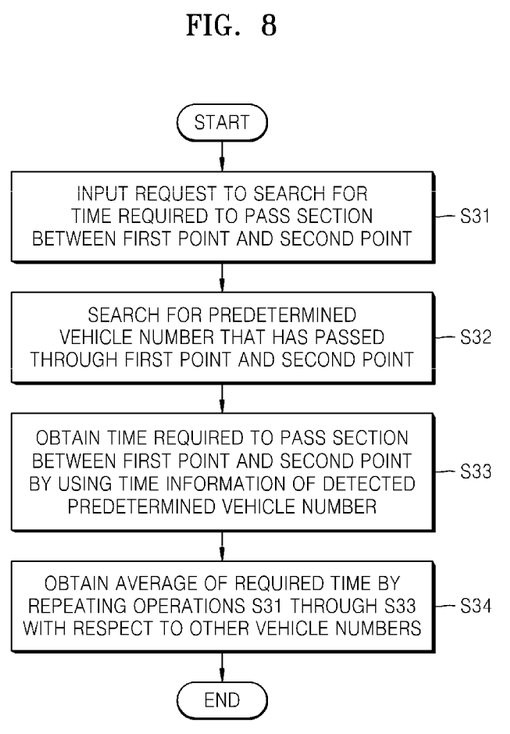
FIG. 8 is a flowchart illustrating a method of calculating a time required to pass a predetermined block, according to an embodiment of the present invention.

FIG. 8 is a flowchart illustrating a method of calculating a time required to pass a predetermined block, according to an embodiment of the present invention.

Referring to FIG. 8, in operation S31, a user requests to search for a time required to pass a section between a first point and a second point by using the user terminal 300.

Next, in operation S32, the integrated control server 200 searches the database 240 to search for a predetermined vehicle number that has passed through the first point and the second point.

Next, in operation S33, the integrated control server 200 obtains time consumed to pass the section between the first point and the second point by using time information of the detected vehicle number.

Finally, in operation S34, operations S31 and S32 are repeated with respect to other vehicle numbers of vehicles that have passed through the first point and the second point to obtain an average of the time required (to pass the section) between the first point and the second point.

According to the above operations, the user may detect an average time between predetermined sections.

According to the embodiments of the present invention, an integrated control system capable of recognizing vehicle license number plates of nearby vehicles using a vehicle surveillance camera, and using the recognized vehicle license number plates and position and time information of a current vehicle to metadatabase road conditions to efficiently detect road conditions and search data regarding the road conditions may be provided.

According to the embodiments of the present invention, in an integrated road control system, road information obtained using a vehicle surveillance camera is transmitted to an integrated control server not as image information but as text information to thereby reduce communication traffic.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An integrated control method using a vehicle surveillance camera, the method comprising:
 receiving, by a server, first license plate number information of a plurality of first nearby vehicles, in a moving traffic, obtained by analyzing a first single image captured by a first vehicle surveillance camera provided in a first image capturing vehicle, wherein the plurality of first nearby vehicles comprises:
  a first front left vehicle located on a front left side of the first image capturing vehicle;

a first front vehicle in front of the first image capturing vehicle; and a first front right vehicle located on a front right side of the first image capturing vehicle;

receiving, by the server, first time information about a first point in time when the first single image is captured by the first vehicle surveillance camera, a first position of the first image capturing vehicle at the first point in time when the first single image is captured and a first speed of the first image capturing vehicle at the first point in time when the first single image is captured;

receiving, by the server, second license plate number information of a plurality of second nearby vehicles, in the moving traffic, obtained by analyzing a second single image captured by a second vehicle surveillance camera provided in a second image capturing vehicle, wherein the plurality of second nearby vehicles comprises:

a second front left vehicle located on a front left side of the second image capturing vehicle;

a second front vehicle in front of the first image capturing vehicle; and a second front right vehicle located on a front right side of the second image capturing vehicle;

receiving, by the server, second time information about a second point in time when the second single image is captured by the second vehicle surveillance camera, a second position of the second image capturing vehicle at the second time when the second single image is captured and a speed of the second image capturing vehicle at the second point in time when the second single image is captured; and constructing a database comprising a first row of data and a second row of data, wherein:

the first row of data includes the first license plate number information of the first front left vehicle, the first front vehicle and the first front right vehicle, the first time information, the first position and the first speed of the first image capturing vehicle, received by the server, and the second row of data includes the second license plate number information of the second front left vehicle, the second front vehicle and the second front right vehicle, the second time information, the second position and the second speed of the second image capturing vehicle, received by the server.

2. The method of claim 1, wherein the first and the second license plate number information of the plurality of the first and the second nearby vehicles, and the first and the second time information and the first and the second positions of the first and the second image capturing vehicles are converted into metadata.

3. The method of claim 1, wherein the first and second license plate number information of the plurality of the first and the second nearby vehicles, and the first and the second time information and the first and the second position information of the first and the second image capturing vehicles are data that are obtained by analyzing the first and the second single images captured by the first and the second vehicle surveillance cameras for a frame of a video image captured and structuring the analyzed data.

4. The method of claim 1, wherein each vehicle surveillance camera is installed on a front side or a lateral side of a vehicle.

5. The method of claim 1, wherein the vehicle license plate number information of the plurality of the first and the second nearby vehicles, the first and the second time information and the first and the second position information of the first and the second image capturing vehicles received by the server are coded data.

6. The method of claim 1, further comprising:
receiving a request to search for a vehicle at a predetermined position and a predetermined time, via the server;
extracting data that corresponds to the search request, from the database, via the server; and
extracting a vehicle number from the extracted data, via the server.

7. The method of claim 1, further comprising:
receiving a request to search for a predetermined vehicle from a user terminal;
extracting any data including the vehicle license plate number information of the predetermined vehicle from the database, via the server,
listing the time information corresponding to the extracted data according to time;
obtaining a movement path of the predetermined vehicle by using the position information corresponding to the listed data.

8. The method of claim 1, further comprising, when the server is to search for a time period required to pass a section between a first position and a second position, wherein the first position is a start position and the second position is an arrival position:
extracting the vehicle license plate number information including both information regarding the first position and information regarding the second position from the database, via the server;
calculating time required for a vehicle having the extracted vehicle license plate number information to pass the section by using time information corresponding to the information regarding the first position and the information regarding the second position, via the server; and
calculating an average of the time required for the vehicle having the extracted vehicle license plate number information to pass the section.

* * * * *